United States Patent [19]

Saita et al.

[11] Patent Number: 5,078,018
[45] Date of Patent: Jan. 7, 1992

[54] REAR WHEEL STEERING MECHANISM FOR MOTOR VEHICLE

[75] Inventors: Norihiro Saita; Ryoji Kasahara; Toshimi Takeshita; Torahiko Koshiba, all of Kanagawa, Japan

[73] Assignee: Atsugi Unisia Corporation, Kanagawa, Japan

[21] Appl. No.: 680,587

[22] Filed: Apr. 4, 1991

[30] Foreign Application Priority Data

Apr. 4, 1990 [JP] Japan .................................. 2-89312
Aug. 31, 1990 [JP] Japan ................................ 2-231206
Oct. 1, 1990 [JP] Japan ............................ 2-102231[U]
Nov. 30, 1990 [JP] Japan ............................ 2-129532[U]

[51] Int. Cl.$^5$ ............................................. F16K 31/52
[52] U.S. Cl. .................................. 74/89.14; 74/49; 74/390; 180/79.1; 180/140
[58] Field of Search ............... 74/498, 89.14, 390, 74/49, 89; 180/79.1, 140; 280/91, 96, 95.1

[56] References Cited

U.S. PATENT DOCUMENTS

| | | | |
|---|---|---|---|
| 3,259,076 | 7/1966 | Halberg et al. | 74/49 X |
| 4,573,494 | 3/1986 | Spurbeck | 74/49 X |
| 4,660,283 | 4/1987 | Yasunaka | 74/49 X |
| 4,672,992 | 6/1987 | Vanderlaan et al. | 74/49 X |

FOREIGN PATENT DOCUMENTS 1040430 10/1953 France .................................. 74/49

Primary Examiner—Leslie A. Braun
Assistant Examiner—William O. Trousdell
Attorney, Agent, or Firm—Bachman & LaPointe

[57] ABSTRACT

A rear wheel steering mechanism is disclosed in which an eccentric shaft drivingly connected to an electric motor includes an eccentric portion, a motion transmitting body is connected to a rod assembly in longitudinal fit manner, and a spherical joint whereby eccentric motion of said eccentric portion in response to rotational motion of the eccentric shaft causes said motion transmitting body to impart at least a reciprocal motion to said rod assembly.

35 Claims, 23 Drawing Sheets

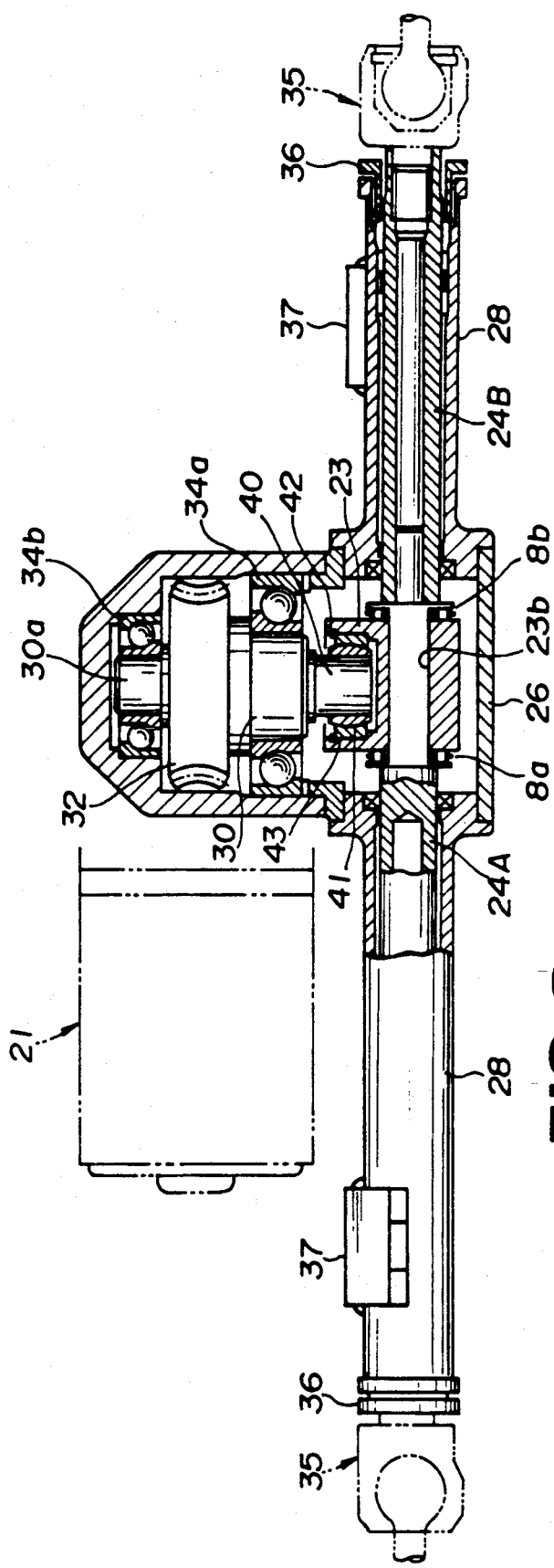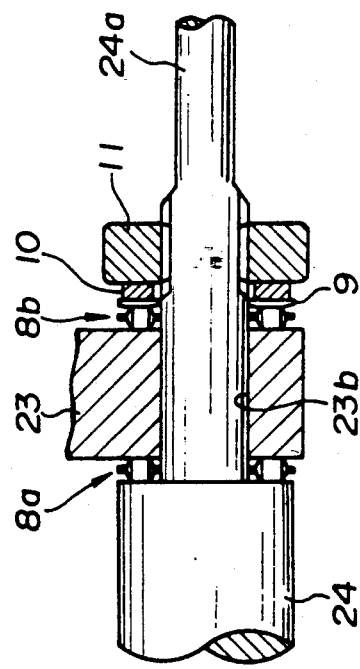

1

REAR WHEEL STEERING MECHANISM FOR MOTOR VEHICLE

BACKGROUND OF THE INVENTION

The present invention relates to a rear wheel steering mechanism for an automotive vehicle.

For increased controllability, steering rear wheels of automotive vehicles is considered to be desirable. A known rear wheel steering mechanism employs an electric motor, a rod assembly operatively connected to rear wheels, and a gearing so constructed and arranged as to impart a reciprocal motion to the rod assembly as an output shaft of the electric motor rotates about its axis of revolution. Occurrence of a backlash in the gearing is unavoidable. Such a backlash is directly transmitted to the rod assembly, resulting in creating an undesired play in the rod assembly.

The present invention aims at providing a rear wheel steering mechanism which is improved such that effect of a backlash of gearing on a rod assembly is minimized.

SUMMARY OF THE INVENTION

According to the present invention, there is provided a rear wheel steering mechanism, comprising:

a motor;

an eccentric shaft having an axis of revolution and drivingly connected to said motor for rotational motion about said axis of revolution, said eccentric shaft includes an eccentric portion;

a rod assembly movable in a longitudinal axis thereof;

a motion transmitting body connected to said rod assembly in longitudinal fit manner, said motion transmitting body being rotatable about said longitudinal axis; and joint means whereby eccentric motion of said eccentric portion in response to rotational motion of said eccentric shaft causes said motion transmitting body to impart at least a reciprocal motion to said rod assembly in said longitudinal axis.

Since the joint means is used, there is little play in motion transmitting path so that the effect of a backlash of gearing on the rod assembly is minimized.

BRIEF DESCRIPTION OF THE DRAWINGS

FIG. 7 is a similar front elevation to FIG. 2, illustrating a third embodiment;

FIG. 8 is an enlarged fragmentary view of FIG. 7 illustrating a fourth embodiment;

DETAILED DESCRIPTION OF THE INVENTION

Referring to FIGS. 1 to 5, the first embodiment of a rear wheel steering mechanism is described.

Figure 1:
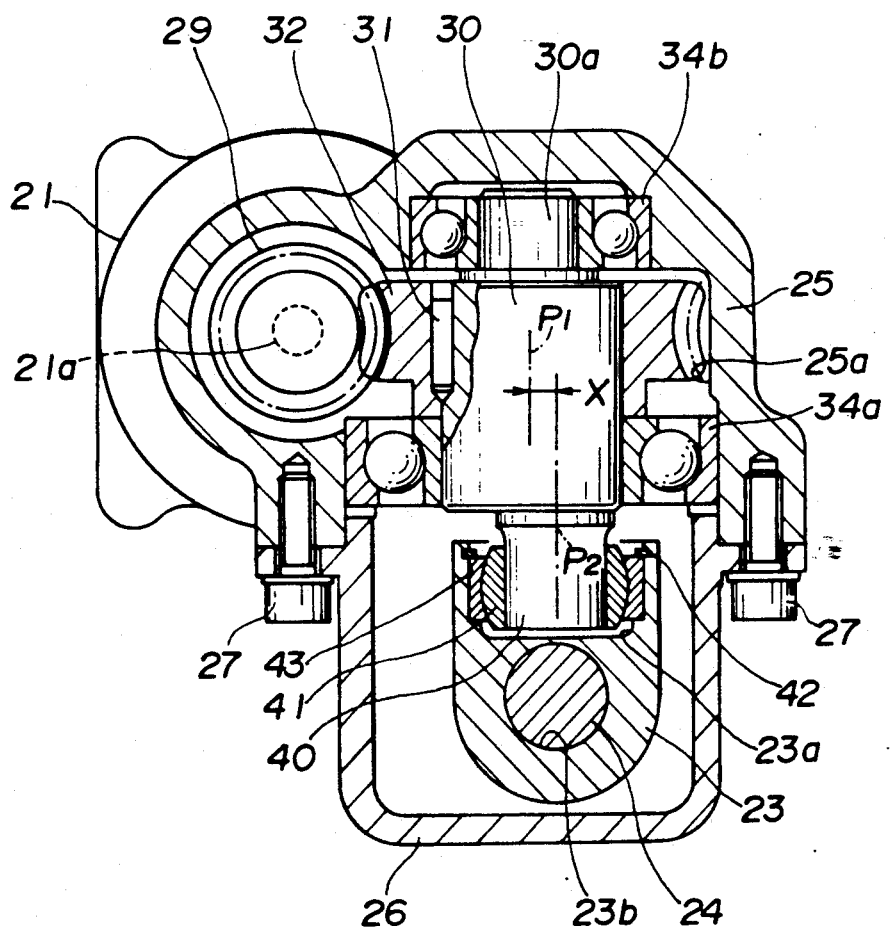
FIG. 1 is an enlarged cross section taken through the line I—I in FIG. 2, illustrating a first embodiment of a rear wheel steering mechanism according to the present invention.
Figure 2:
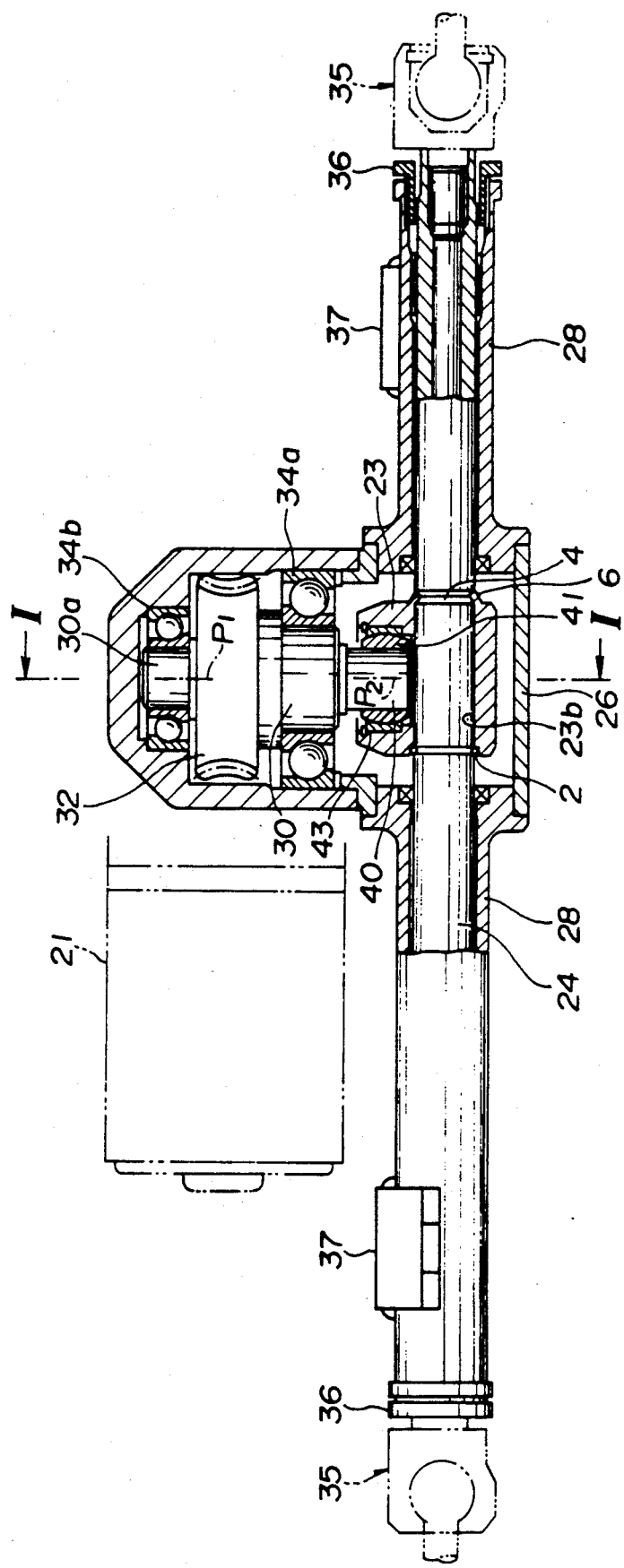
FIG. 2 is a front elevation, partly sectioned, of the first embodiment.
Figure 5:
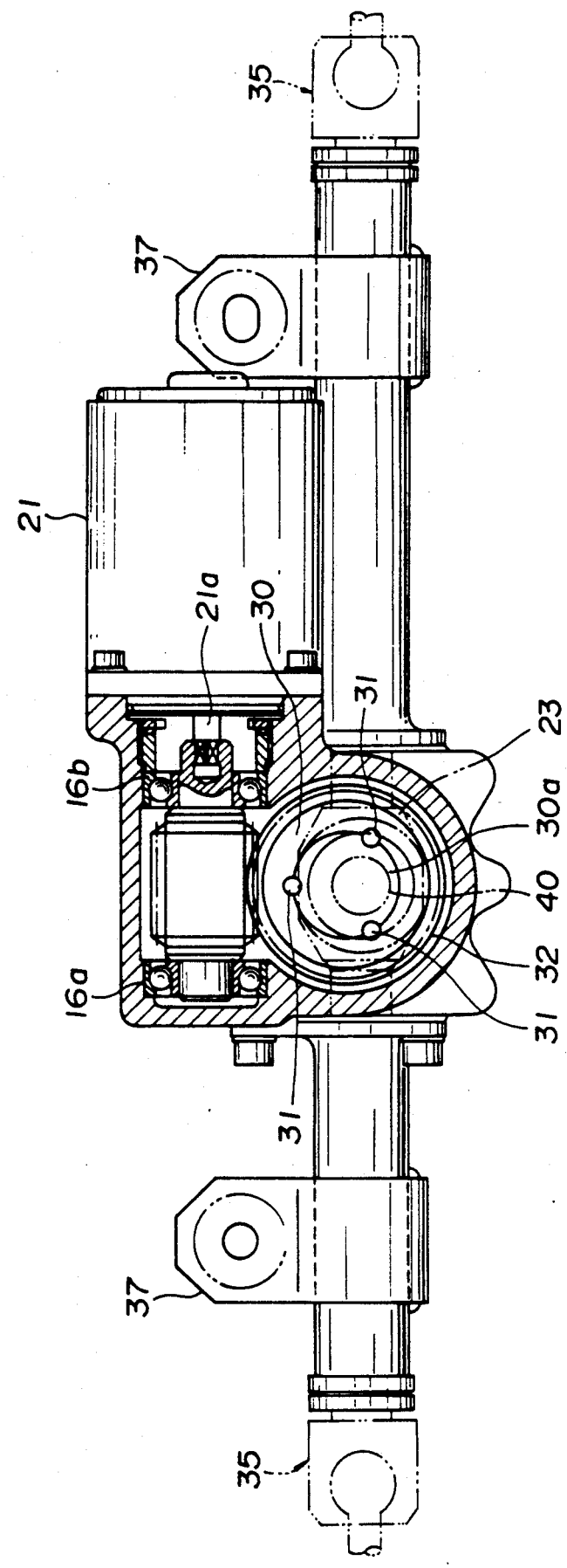
FIG. 5 is a plan view, partly sectioned, of the first embodiment.

As shown in FIGS. 1, 2, and 5, the rear wheel steering mechanism comprises a housing 25 fixedly mounted to an automotive vehicle, an electric DC motor 21 fixedly mounted to the housing 25 (see FIG. 5). As best seen in FIG. 1, the housing 25 is formed with a stepped bore 25a in which an eccentric shaft 30 is rotatably supported by a relatively large bearing 34a and a relatively small bearing 34b. The eccentric shaft 30 rotatably supported by the bearing 34a and a reduced diameter portion 30a rotatably supported by the bearing 34b. Thus, the eccentric shaft 30 has an axis of revolution $P_1$, and is drivingly connected to the motor 21 via a reduction gearing including a worm pinion 29 and a worm wheel 32. As seen in FIG. 5, the worm pinion 29 is rotatably mounted within the housing 25 at two spaced bearings 16a and 16b, and has one axial end portion thereof fixedly coupled with an output shaft 21a of the motor 21. The worm wheel 32 is coupled with the eccentric shaft 30 and held in rotation therewith by three pins 31 (see FIGS. 1 and 5). Owing to this reduction gearing, rotation of the motor 21 causes the eccentric shaft 30 to rotate about the axis of revolution $P_1$. The eccentric shaft 30 includes an eccentric portion 40 in the form of a pivot having a center axis $P_2$ extending in parallel to and displaced from the axis of revolution $P_1$ by a predetermined amount X.

As best seen in FIG. 2, a rod assembly 24 is movably mounted within a pair of rod casings 28 which are fixedly mounted to the automotive vehicle by mounting brackets 37. The rod assembly is movable in its longitudinal axis and has ball joints 35 at the opposite ends. The ball joints 35 are linked to left and right rear wheels of the automotive vehicle. The longitudinal movement of the rod assembly 24 in one direction is limited when one of the ball joints 35 is engaged by the adjacent one of stoppers 36, while the longitudinal movement in the opposite direction is limited when the other ball joint 35 is engaged by the adjacent stopper 36. The rod assembly 24 is rotatable about the longitudinal axis.

As seen in FIG. 2, the pair of rod casings 28 are inserted into a casing 26 which is bolted to the housing by means of bolts 27 (see FIG. 1). In order to transmit motion of the eccentric portion 40 to the rod assembly 24, a motion transmitting body 23 is connected to the rod assembly 24 in longitudinal fit manner. The motion transmitting body 23 is rotatable with the rod assembly 24 about the longitudinal axis. The motion transmitting body 23 is formed with a bore 23a which receives the pivot 40. A spherical bearing 41 is fixedly coupled with the pivot 40 and a spherical bearing retainer ring 43 is fixedly received by the bore 23a by a stop ring 42. The spherical bearing 41 and the mating spherical bearing retainer ring 43 cooperate to form a spherical joint whereby eccentric motion of the eccentric portion in the form of the pivot 40 in response to rotational motion of the eccentric shaft 30 causes the motion transmitting body 23 to impart a reciprocal to the rod assembly 24 and a rotational motion to the rod assembly 24 about the longitudinal axis.

Referring to FIG. 2, the motion transmitting body 23 is formed with a through bore 23b which allows the rod assembly 24 to extend therethrough. The rod assembly 24 is formed with a circumferential ring groove receiving a stop ring 2 and a shoulder 4 at axially spaced portions, respectively. The motion transmitting assembly 23 has one axial end face adjacent to one axial end of the through bore 23b in abutting engagement with the stop ring 2 and an extension 6 adjacent to the opposite axial end of the through bore 23b. The extension 6 is bent into engagement with the shoulder 4 to form a caulked joint. In this manner, the motion transmitting body 23 of this embodiment is movable with the rod assembly 24 in and about the longitudinal direction.

Figure 3:
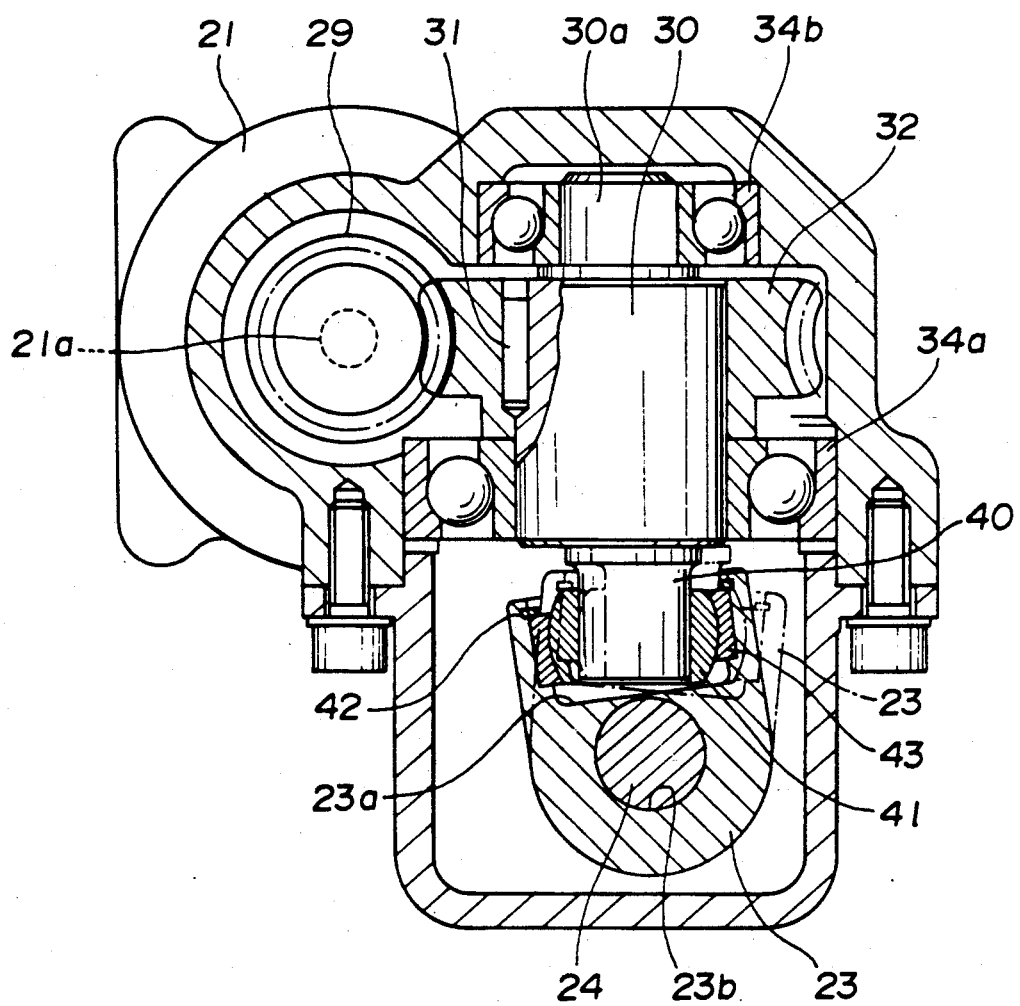
FIG. 3 is a similar view to FIG. 1 illustrating in fully drawn line one of two limit positions of parts of the first embodiment and in phantom line the other limit position.
Figure 4:
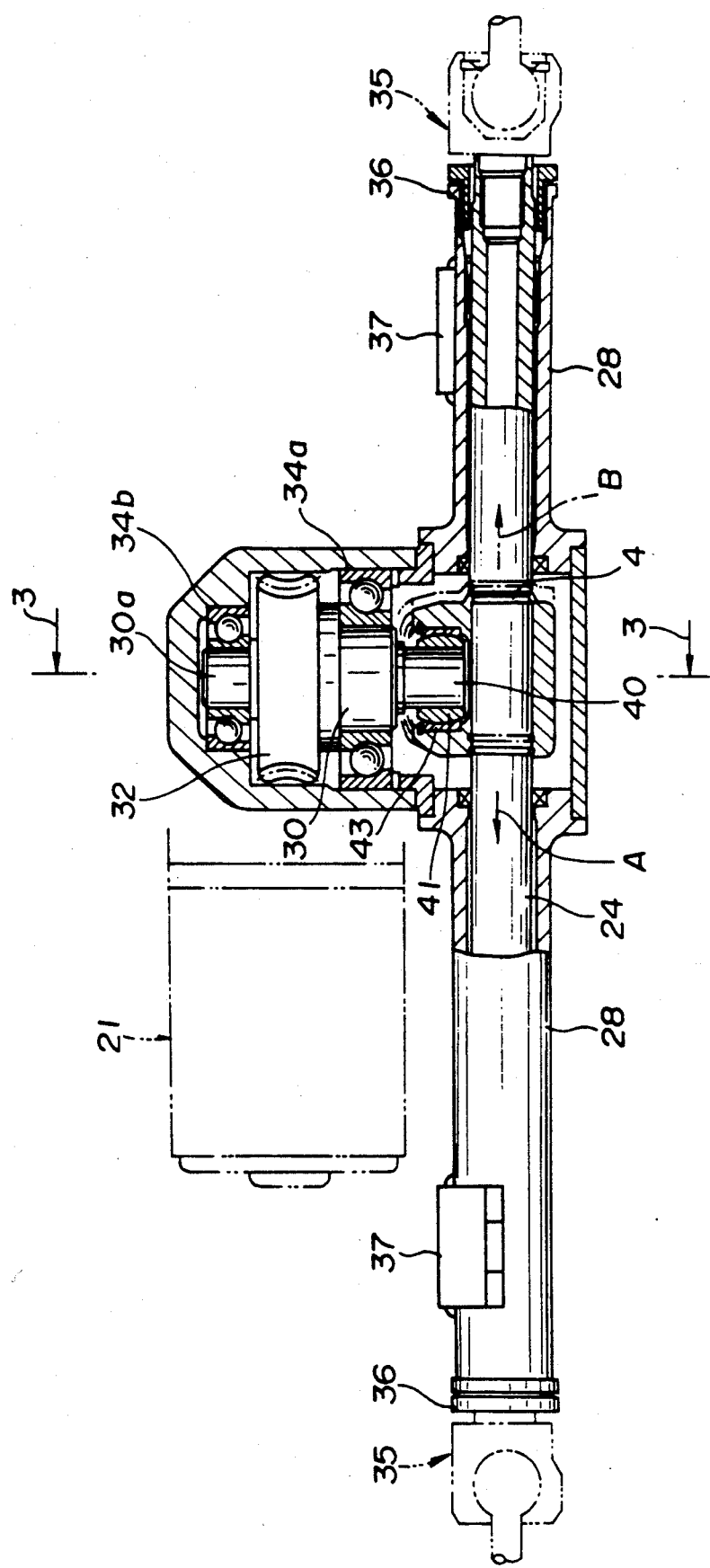
FIG. 4 is a similar view to FIG. 2 illustrating in fully drawn line one of the two limit position of parts of the first embodiment and in phantom line the other limit position.

Referring to FIGS. 3 and 4, the operation of this embodiment is explained. When the DC motor 21 rotates in one direction to its limit, the eccentric shaft 30 rotates. This rotation of the eccentric shaft 30 causes the pivot 40 to rotate the motion transmitting body 23 to rotate from the central position to the inclined position as illustrated by the fully drawn line in FIG. 3 and moves the pivot 40 in the longitudinal direction as indicated by an arrow A to position illustrated by the fully drawn line in FIG. 4. When the DC motor 21 rotates in the opposite direction to the opposite limit, the motion transmitting body 23 moves in the longitudinal direction as indicated by an arrow B to the position as illustrated by the phantom lines in FIGS. 3 and 4.

Figure 6:
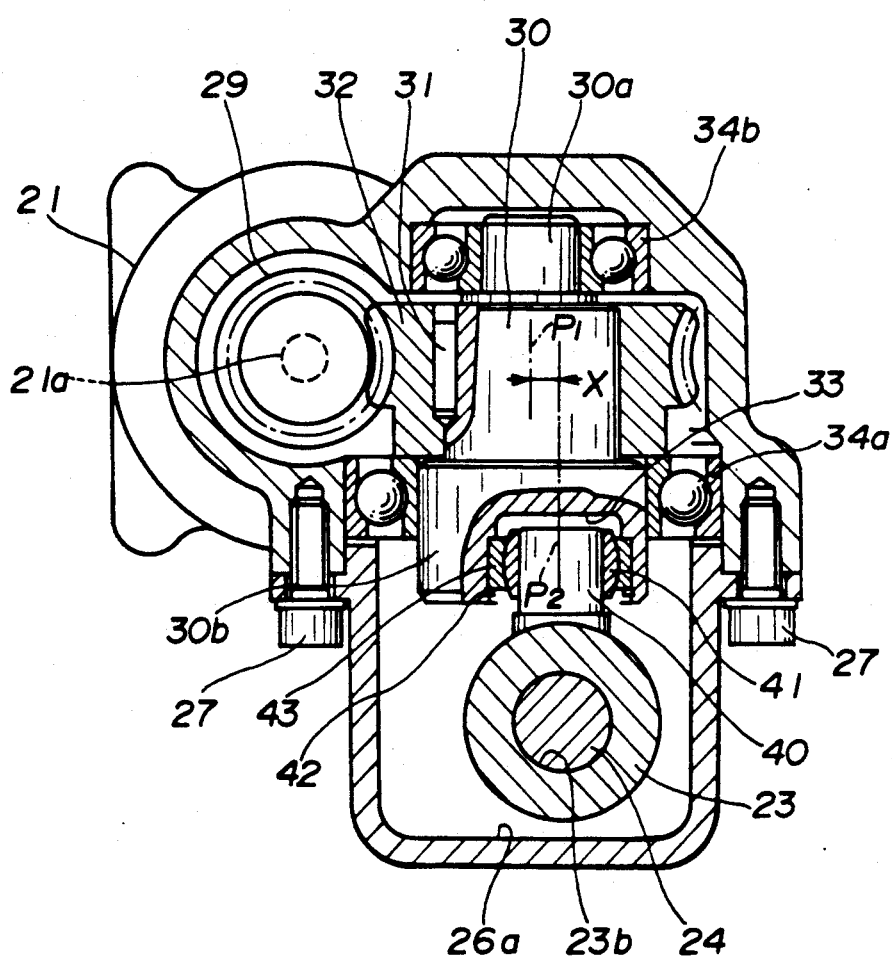
FIG. 6 is a similar cross section to FIG. 1, illustrating a second embodiment.

Referring to FIG. 6, the second embodiment is described. This second embodiment is substantially the same as the first embodiment except that, in the case of the second embodiment, an eccentric portion is in the form of a cylindrical bore 33 which an enlarged diameter end portion 30b of an eccentric shaft 30, and a motion transmitting body 23 has a pivot 40 extending into the cylindrical bore 33. This bore 33 has a center axis $P_2$ extending in parallel to and displaced from an axis of revolution $P_1$. A spherical bearing 41 is fixedly coupled to the pivot 40 of the motion transmitting body 23, while a spherical bearing retainer 43 is fixedly received by the bore 33 by means of a stop ring 42.

In the first and second embodiments just described, the motion transmitting body 23 is movable with the rod assembly 24 not only in the longitudinal axis but also about the longitudinal axis.

In the third and fourth embodiments shown in FIGS. 7 and 8, respectively, in order to reduce load on the motor 21, the motion transmitting body 23 is rotatable relative to the rod assembly 24.

In the third embodiment shown in FIG. 7, a rod assembly 24A and 24B has a first radially extending wall opposed to one end face of a motion transmitting body 23 adjacent to one end of a through bore 23b, and a second radially extending wall opposed to the opposite end face of the motion transmitting body 23 adjacent to the opposite end of the through bore 23b. A first thrust bearing 8a is disposed between the first radially extending wall of the rod assembly 24A and 24B and the one end face of the motion transmitting body 23. A second thrust bearing 8b is disposed between the second radially extending wall of the rod assembly 24A and 24B and the opposite end face of the motion transmitting body 23.

The rod assembly includes a first rod 24B which is bored from one axial end thereof and disposed outside of the through bore 23b, and a second rod 24A extending through the through bore 23b and inserted into the first rod 24B in press fit manner. The second rod 24A includes a shoulder opposed to said one axial end face of the motion transmitting body 23. This shoulder forms the first radially extending wall, while the one axial end of the first rod 24B forms the second radially extending wall.

The fourth embodiment shown in FIG. 8 is different from the previously described third embodiment in the following respects. A rod assembly 24 is a single rod which includes a shoulder opposed to the adjacent one end face of a motion transmitting body 23. An annular member 9 is coupled with the rod assembly 24 adjacent to the opposite end face of the motion transmitting body 23. A first thrust bearing 8a and a second thrust bearing 8b are disposed as shown in FIG. 8. The annular member 9 is held in the illustrated position by means of a lock nut 11 via a spacer 10.

Figure 9:
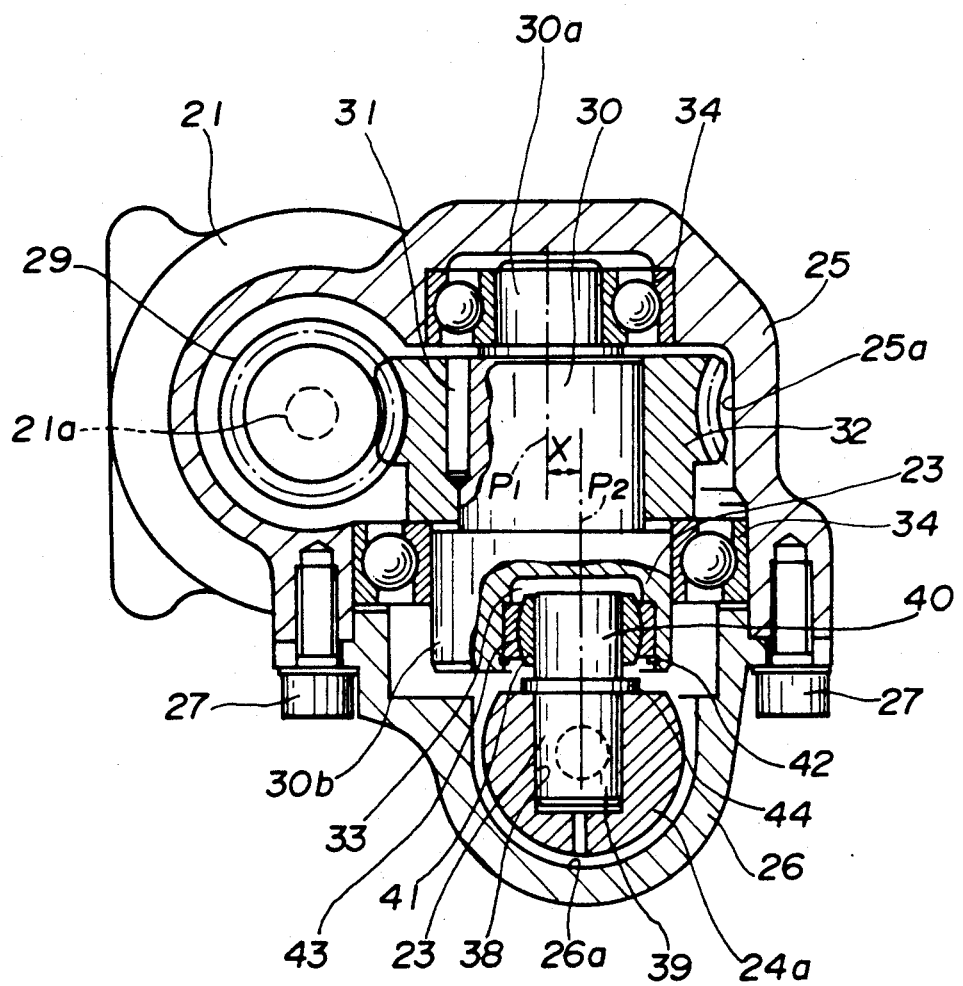
FIG. 9 is a cross section taken through the line IX—IX in FIG. 10, illustrating a fifth embodiment.
Figure 10:
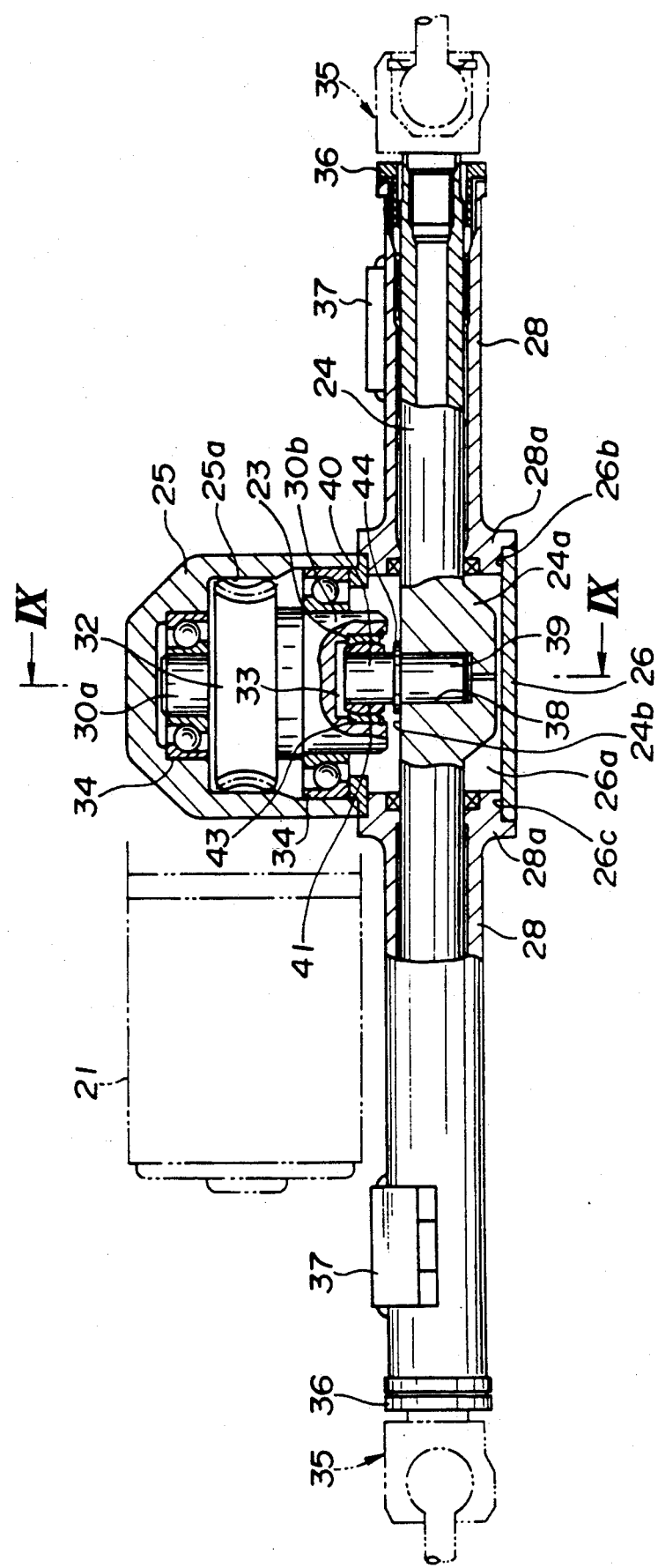
FIG. 10 is front elevation, partly sectioned, of the fifth embodiment.

Referring to FIGS. 9 and 10, the fifth embodiment is described. This fifth embodiment is substantially the same as the second embodiment shown in FIG. 6, but different from the latter in the manner of connecting a motion transmitting body 23 to a rod assembly 24. The rod assembly is a single rod having a radially enlarged portion 24a formed with a diametrical bore 38. The motion transmitting body 23 is press fit in the bore 38 and has an intergal pivot 40.

Figure 11:
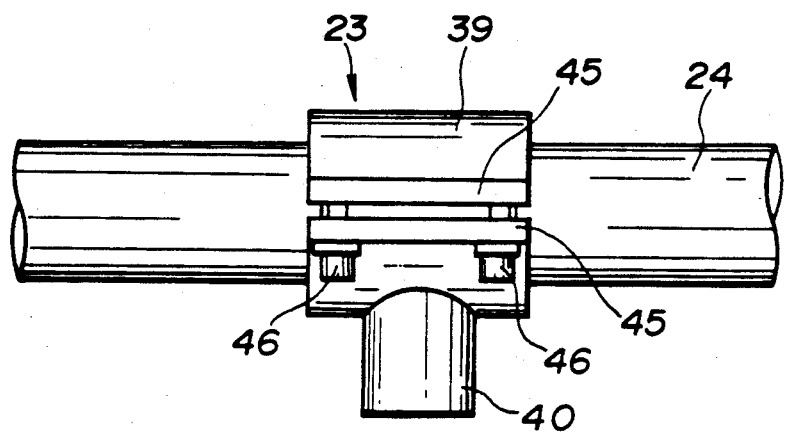
FIG. 11 is a fragmentary front elevation of a sixth embodiment, illustrating a rod assembly with a motion transmitting body with a pivot.
Figure 12:
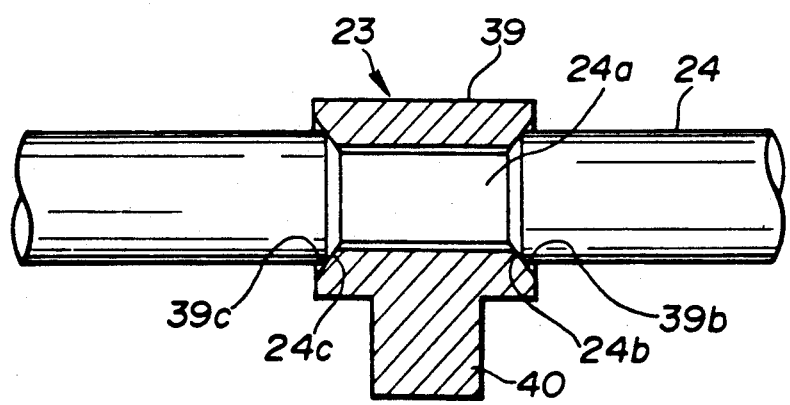
FIG. 12 is a similar view to FIG. 11 with the motion transmitting body sectioned.
Figure 13:
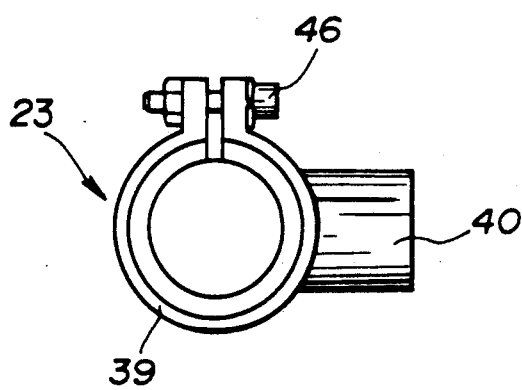
FIG. 13 is an end view of the motion transmitting body removed from the rod assembly.

Referring to FIGS. 11, 12, and 13, the sixth embodiment is described. This embodiment is substantially the same as the fifth embodiment shown in FIGS. 9 and 10 except the manner of connecting a motion transmitting body 23 to a rod assembly 24.

In this sixth embodiment, the rod assembly is a single rod 24 having a reduced diameter middle portion 24a connecting with the remaining portions via tapered shoulders 24b and 24c. The motion transmitting body 23 includes a collar 39 securing the single rod 24 at said reduced diameter middle portion 24a. The collar 39 of the motion transmitting body 24 is formed with wedge surfaces 39b and 39c acting on said tapered shoulders 24b and 24c, respectively. A pair of bolts 46 fixedly secure the flanges 45 of the collar 39.

Figure 14:
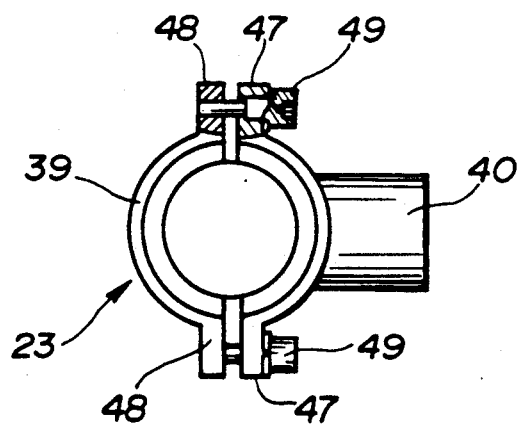
FIG. 14 is a similar view to FIG. 13, illustrating a seventh embodiment.

The seventh embodiment shown in FIG. 14 is different from the sixth embodiment in that a collar 39 is a split type and secured to each other by bolts extending through the mating flanges 47 and 48.

Figure 15:
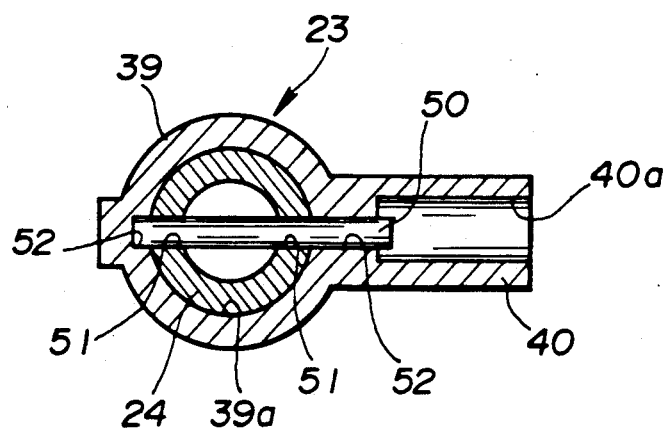
FIG. 15 is a cross section of a rod assembly with a motion transmitting body, illustrating an eighth embodiment.
Figure 16:
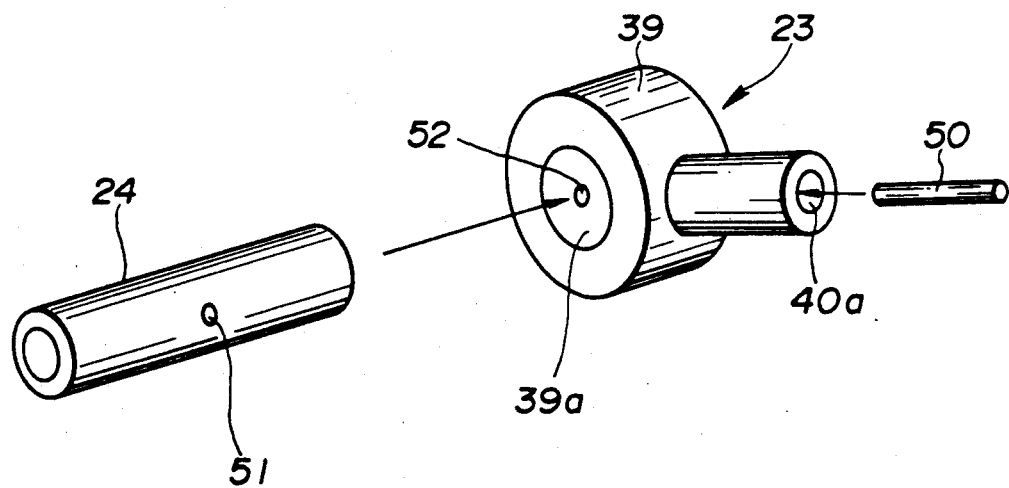
FIG. 16 is an exploded perspective fragmentary view of FIG. 15.

Referring to FIGS. 15 and 16, the eighth embodiment is described. In this embodiment, a rod assembly 24 is a single rod formed with a diametrical hole 51. A motion transmitting body 23 has a collar 39 with a through bore 39a which allows the single rod 24 to extend therethrough. The collar 39 is formed also with two diametrically opposed bores 52. A cotter pin 50 extends through the diametrical hole 51 of the single rod 24 and has both ends received by the two diametrically opposed bores 52, respectively. A pivot 40 of the motion transmitting body 23 is hollowed at 40a to allow insertion of the cotter pin 50.

Figure 17:
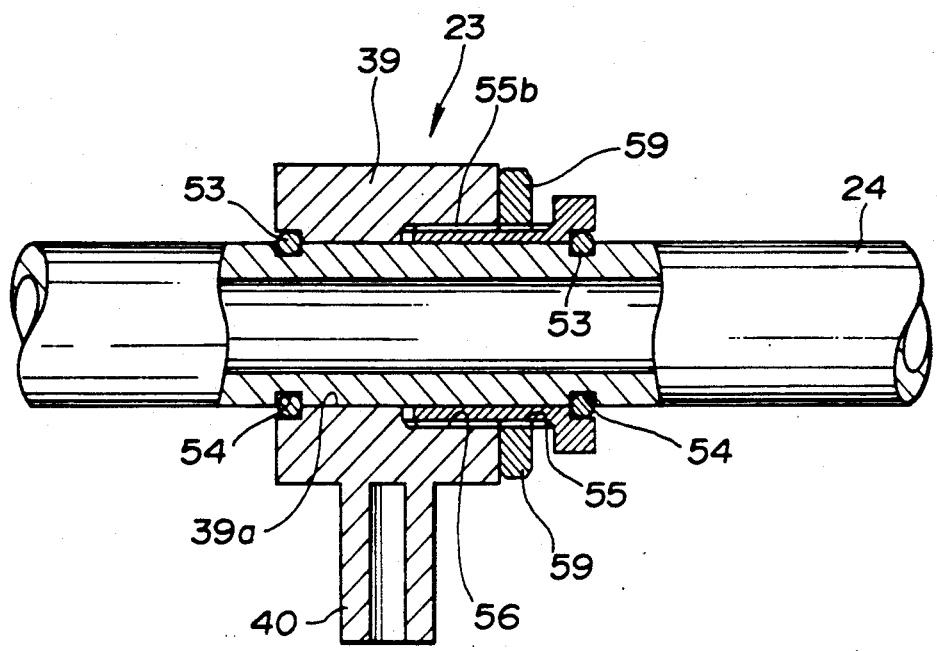
FIG. 17 is a similar view to FIG. 11, illustrating a ninth embodiment.
Figure 18:
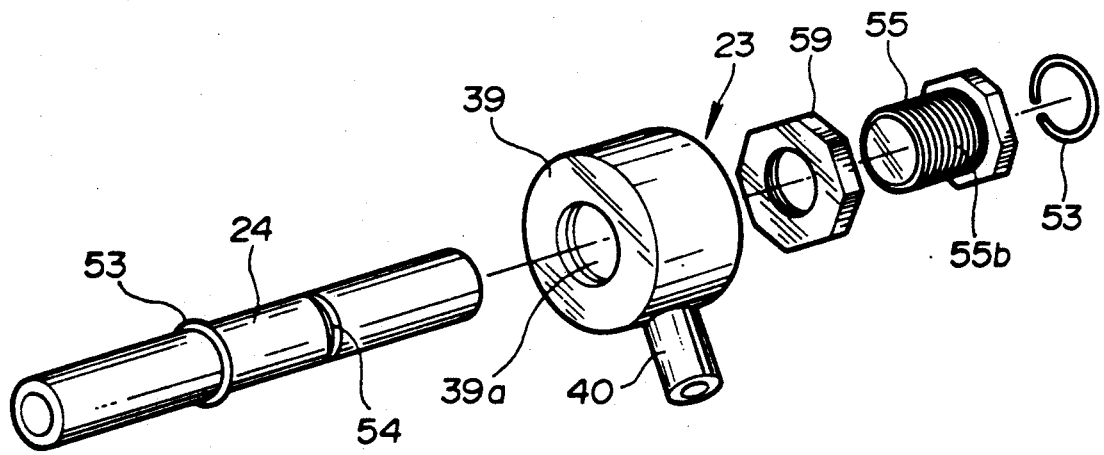
FIG. 18 is an exploded perspective view of FIG. 17.

Referring to FIGS. 17 and 18, the ninth embodiment is described. In this embodiment, a rod assembly is a single rod 24 formed with two axially spaced circumferential grooves 54. A motion transmitting body 23 has a collar 39 formed with a stepped through bore 39a allowing the single shaft 24 to extend therethrough. The stepped through bore 39a includes a reduced diameter bore section and an increased diameter bore section 56. A hollowed bolt 55 is slidably coupled with the single rod 24 and includes a head and a tapped cylinder 55b inserted into an annular space formed between the increased diameter bore section 56 and the single rod 24. Two stop rings 53 are received in the circumferential grooves 54 of the single rod 24 in abutting engagement with the head of the hollowed bolt 55. An axial end face of the collar 39 of the motion transmitting body 23 adjacent to the reduced diameter bore section 56 to limit axial separation of the hollowed bolt 55 from the motion transmitting body 23. The increased diameter bore section 56 is tapped to threadedly engage with the tapped cylinder 55b of the hollowed bolt 55. A lock nut 59 is threadedly engaged with the tapped cylinder 55b in abutting engagement with the opposite axial end face of the collar 39 of the motion transmitting body 23 adjacent to the increased diameter bore section 56.

Figure 19:
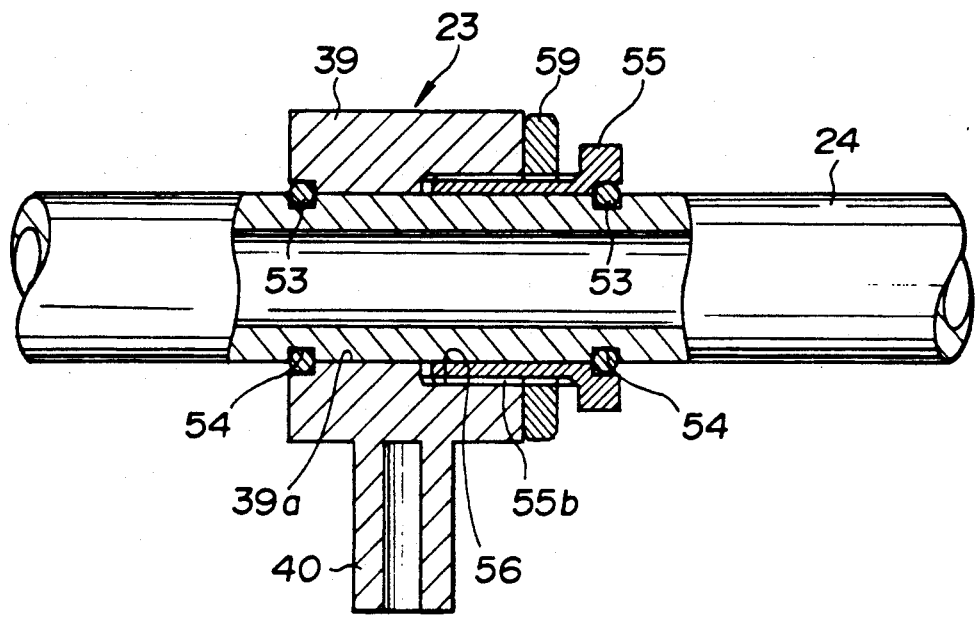
FIG. 19 is a similar view to FIG. 17, illustrating a tenth embodiment.

The tenth embodiment shown in FIG. 19 is different from the ninth embodiment in that the increased diameter stepped portion 56 is not tapped and thus not in threaded engagement with a tapped cylinder 55b of a hollowed bolt 55.

Figure 20:
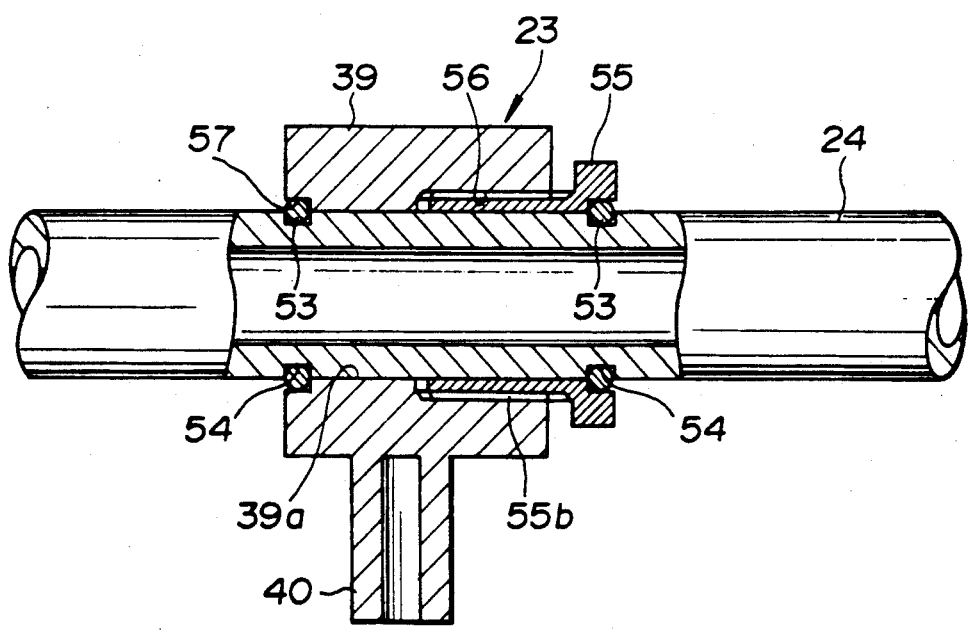
FIG. 20 is a similar view to FIG. 17, illustrating an eleventh embodiment.

The eleventh embodiment shown in FIG. 20 is different from the ninth embodiment in that a lock nut is not employed.

Figure 21:
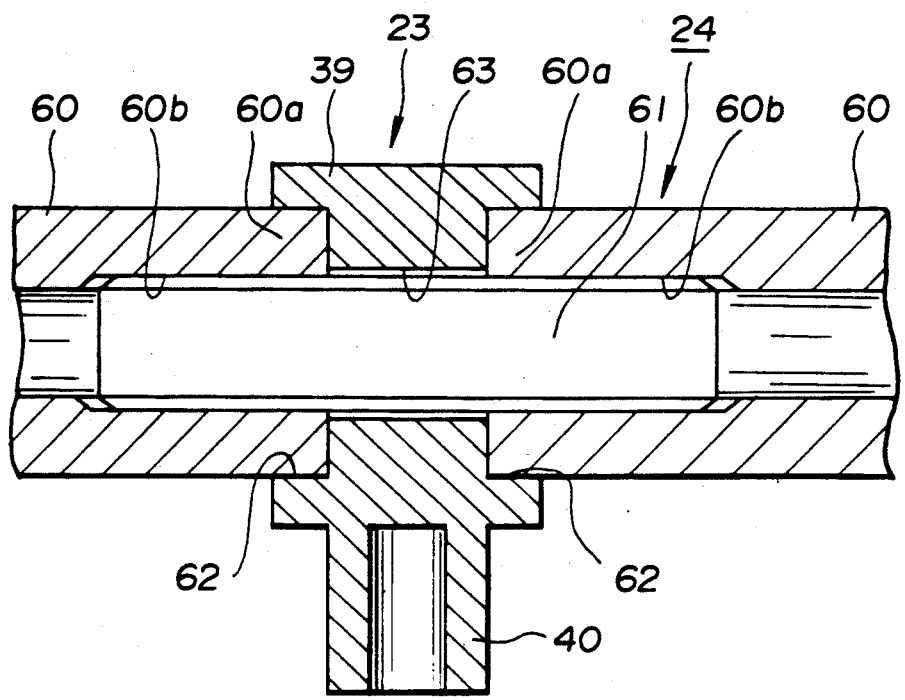
FIG. 21 is a similar view to FIG. 17, illustrating a twelfth embodiment.
Figure 22:
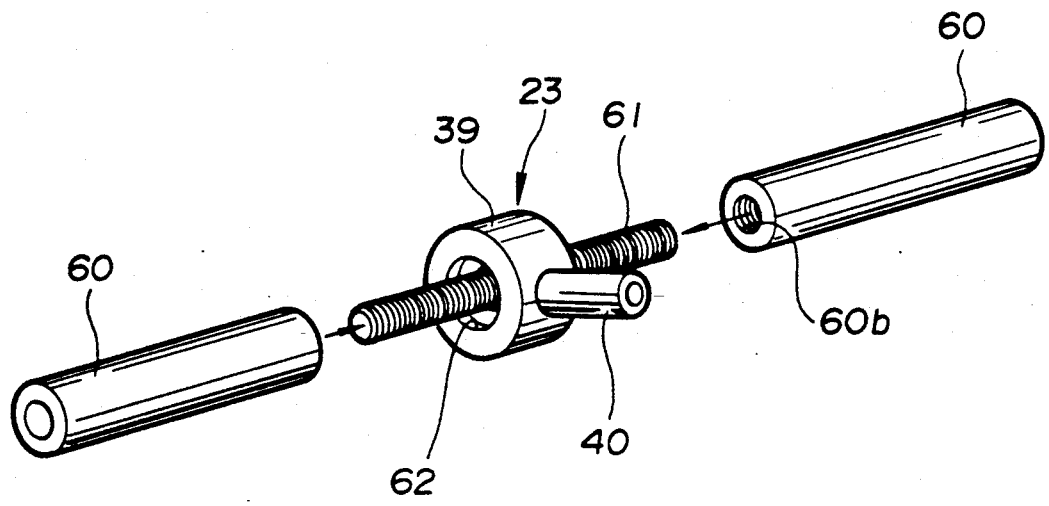
FIG. 22 is an exploded perspective view of FIG. 21.

Referring to FIGS. 21 and 22, the twelfth embodiment is described. In this embodiment, a rod assembly 24 includes a first hollowed rod 60 with a tapped bore 60b, a second hollowed rod 60 with a tapped bore 60b, and a tapped connection rod 61 extending through a collar 39 of a motion transmitting body 23. The tapped connection rod 61 is threadedly engaged with the tapped bores 60b of the first and second hollowed rods 60. The collar 39 is tapped at a bore 63 to threadedly engage with the tapped connection rod 61, and formed with guide portions 62 receiving the axial ends of the first and second rods 60.

Figure 23:
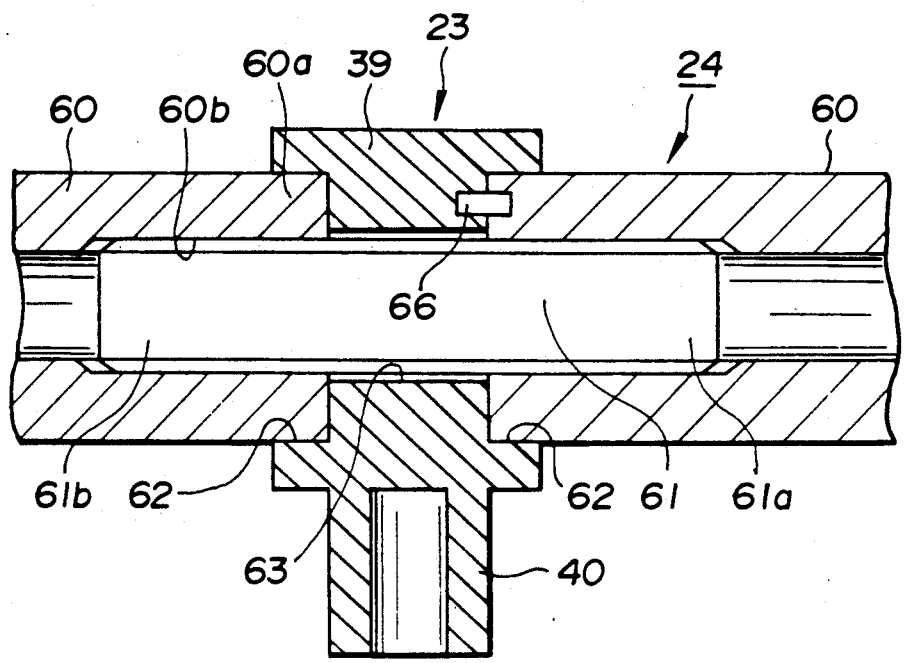
FIG. 23 is a similar view to FIG. 21, illustrating a thirteenth embodiment.
Figure 24:
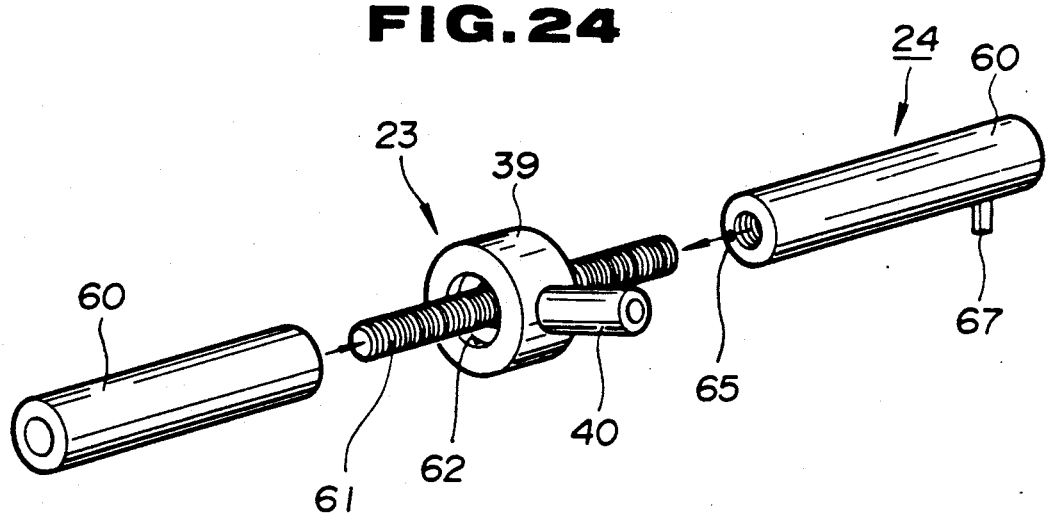
FIG. 24 is an exploded perspective view of FIG. 23.

The thirteenth embodiment shown in FIGS. 23 and 24 is different from the twelfth embodiment in the provision of a locate pin 66, and a stroke sensing pin 67 on one of rods 60.

Figure 25:
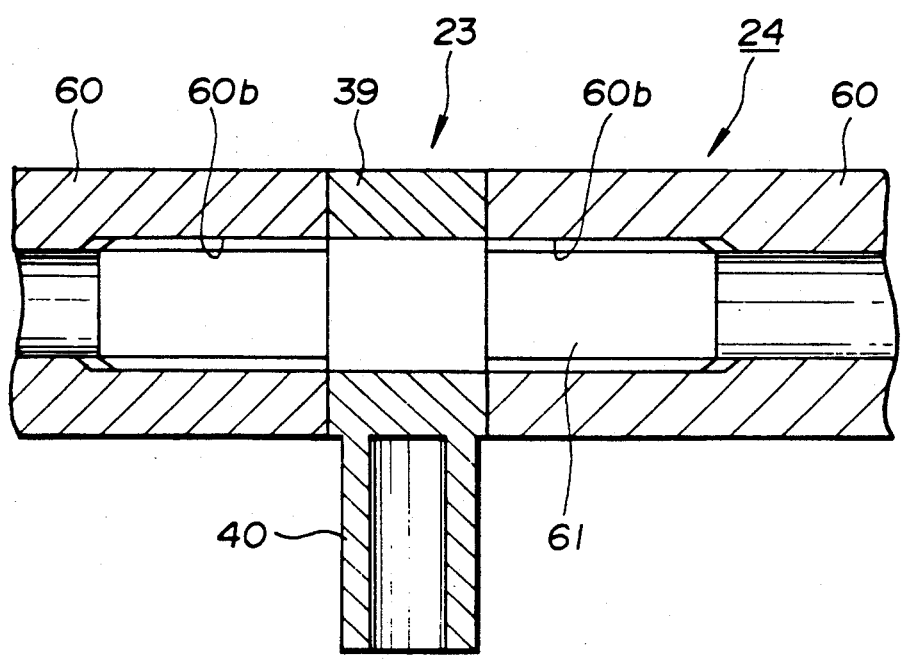
FIG. 25 is a similar view to FIG. 21, illustrating a fourteenth embodiment.
Figure 26:
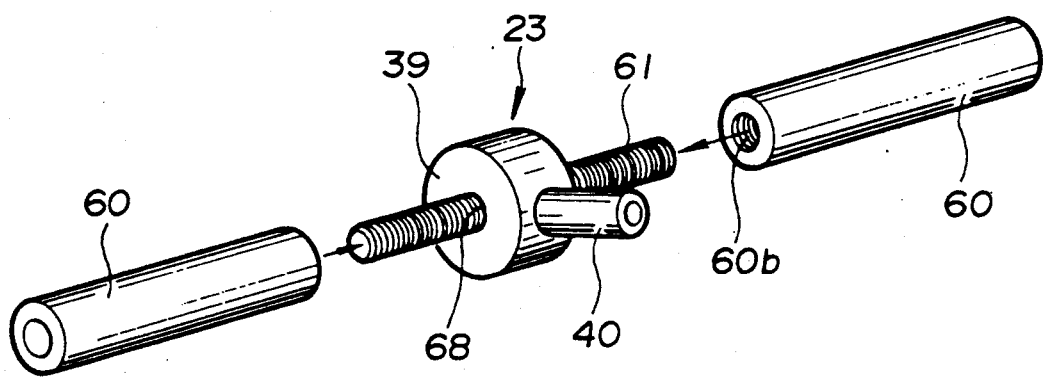
FIG. 26 is an exploded perspective view of FIG. 25.

The fourteenth embodiment shown in FIGS. 25 and 26 is different from the twelfth embodiment in that a tapped connection rod 61 is fixedly connected to a motion transmitting body by press fit.

Figure 27:
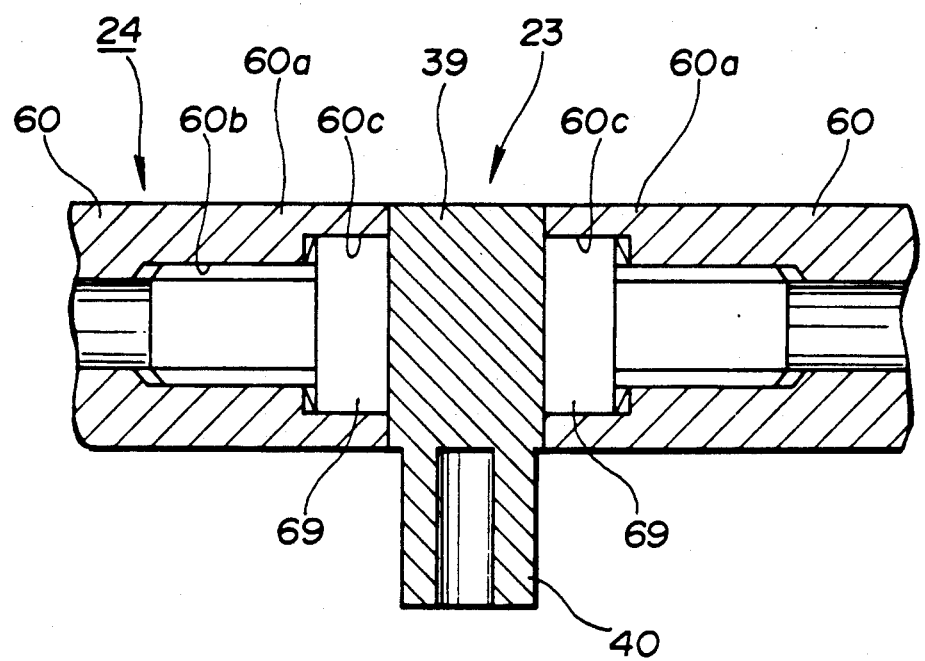
FIG. 27 is a similar view to FIG. 21, illustrating a fifteenth embodiment.

The fifteenth embodiment shown in FIG. 27 is different from the fourteenth embodiment in that a motion transmitting body 23 is formed with projections 69 received in the corresponding bore of rods 60.

Figure 28:
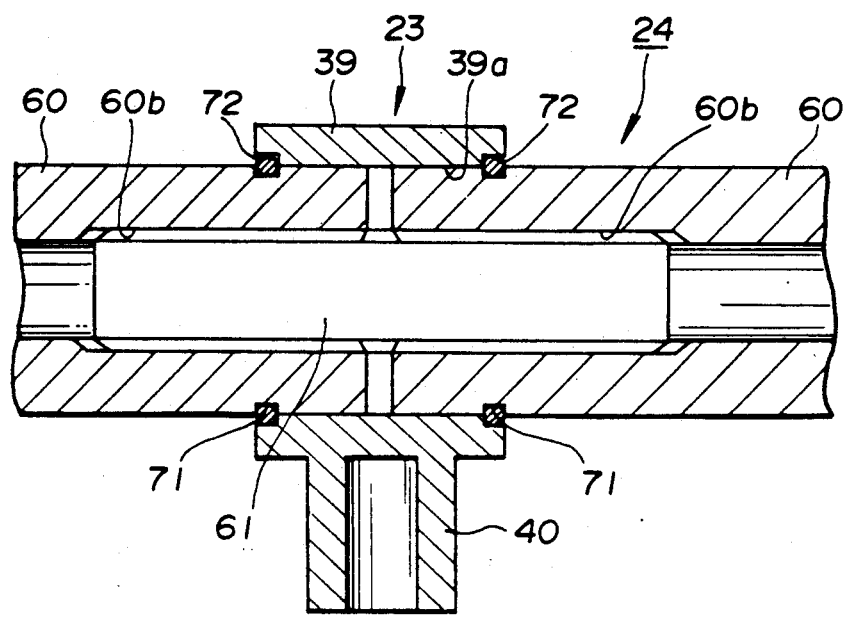
FIG. 28 is a similar view to FIG. 21, illustrating a sixteenth embodiment.
Figure 29:
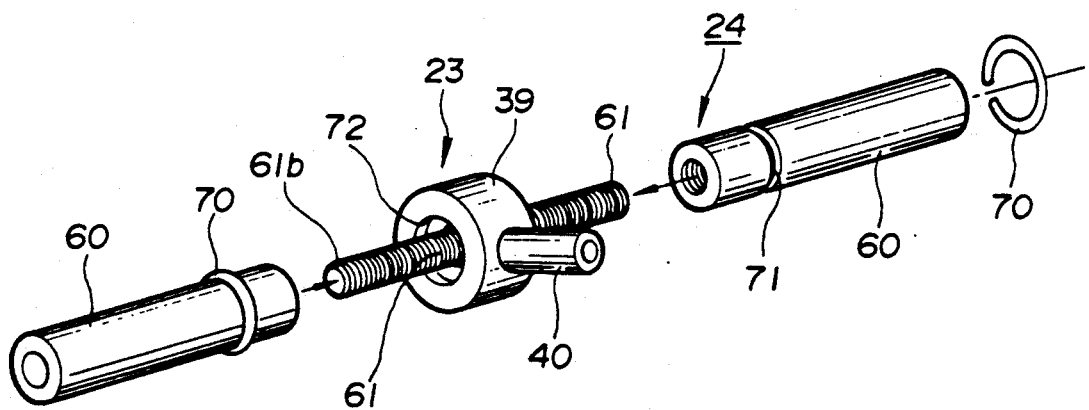
FIG. 29 is an exploded perspective view of FIG. 28.

The sixteenth embodiment shown in FIGS. 28 and 29 is different from the fifteenth embodiment in that a motion transmitting body 23 is formed with a through bore 39a to receive ends of first and second hollowed rods 60, and C rings 70 received in the corresponding grooves 71 hold the motion transmitting body 23.

Figure 30:
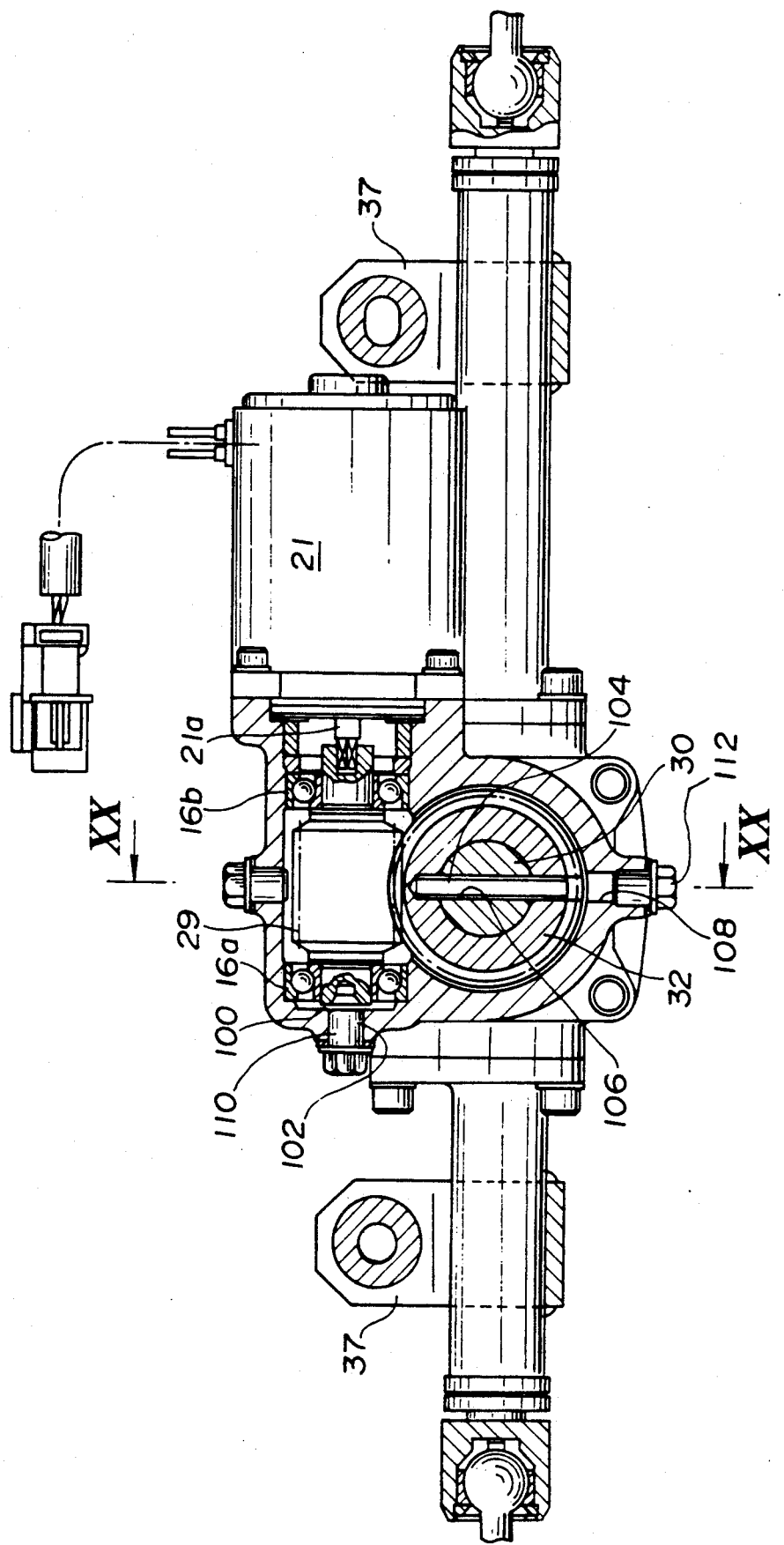
FIG. 30 is a similar view to FIG. 5, illustrating a seventeenth embodiment.
Figure 31:
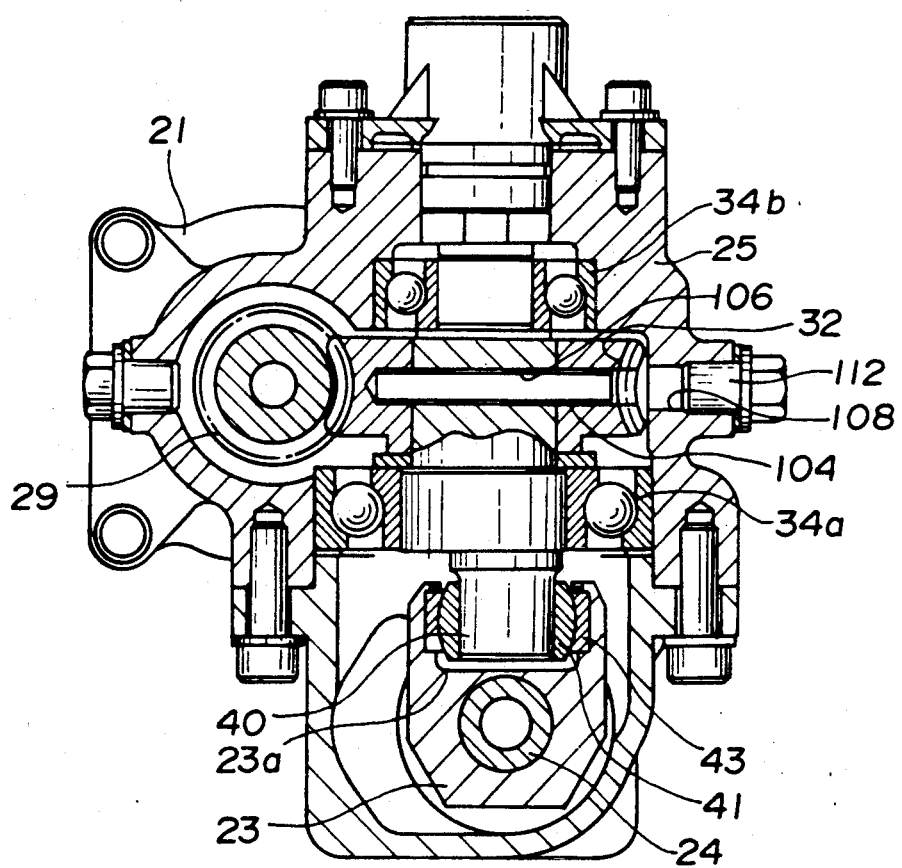
FIG. 31 is a cross section taken through the line XX—XX in FIG. 30.

Referring to FIGS. 30 and 31, the seventeenth embodiment is described. This embodiment is substantially the same as the first embodiment, but it is different from the latter in that a worm pinion 29 is formed with a ranch or tool engaging hole 100 for receiving an appropriate adjustment tool, and a housing 25 is formed with a hole 102 for allowing insertion of the adjustment tool, a cotter pin 104 is inserted into a pin receiving hole 106 formed through an eccentric shaft 30 and a worm wheel 32. The housing 25 is formed with a pin hole 108 allowing insertion of the cotter pin 104. The holes 102 and 108 are plugged by bolts 110 and 112, respectively. After adjustment by manually turning the worm pinion 29 using the adjustment tool inserted to engage the worm pinion 29, the cotter pin 104 is inserted to hols the worm wheel 32 to the eccentric shaft 30.

Figure 32:
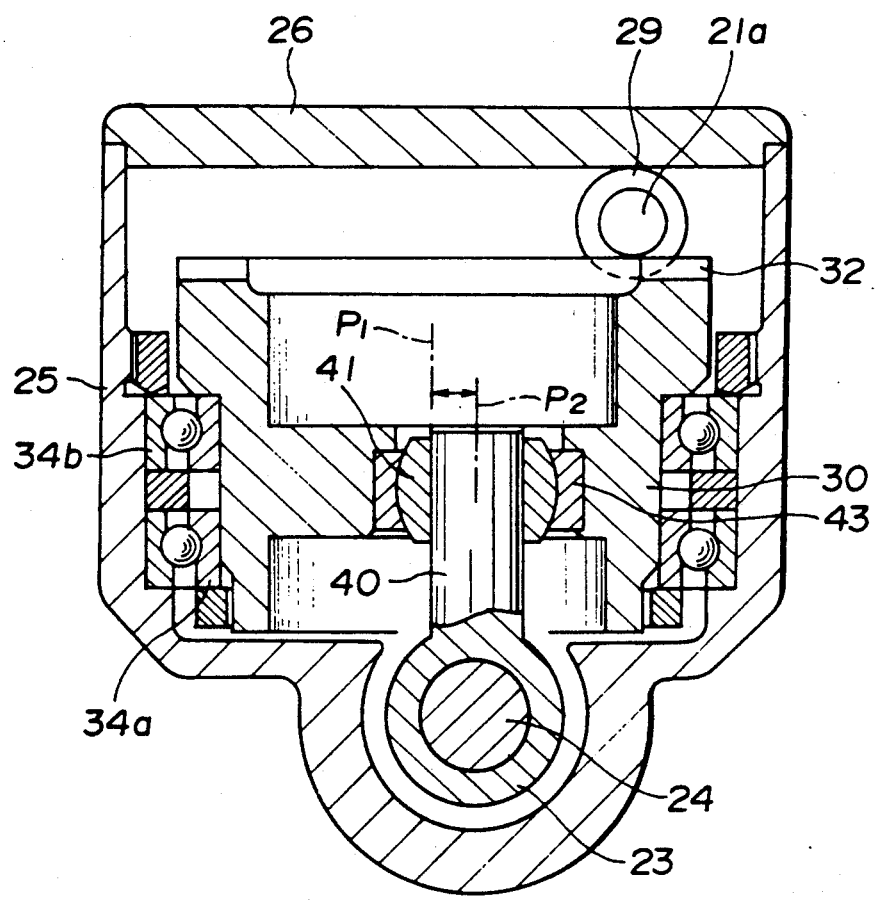
FIG. 32 is a cross section taken through the line XXI—XXI in FIG. 33, illustrating an eighteenth embodiment.
Figure 33:
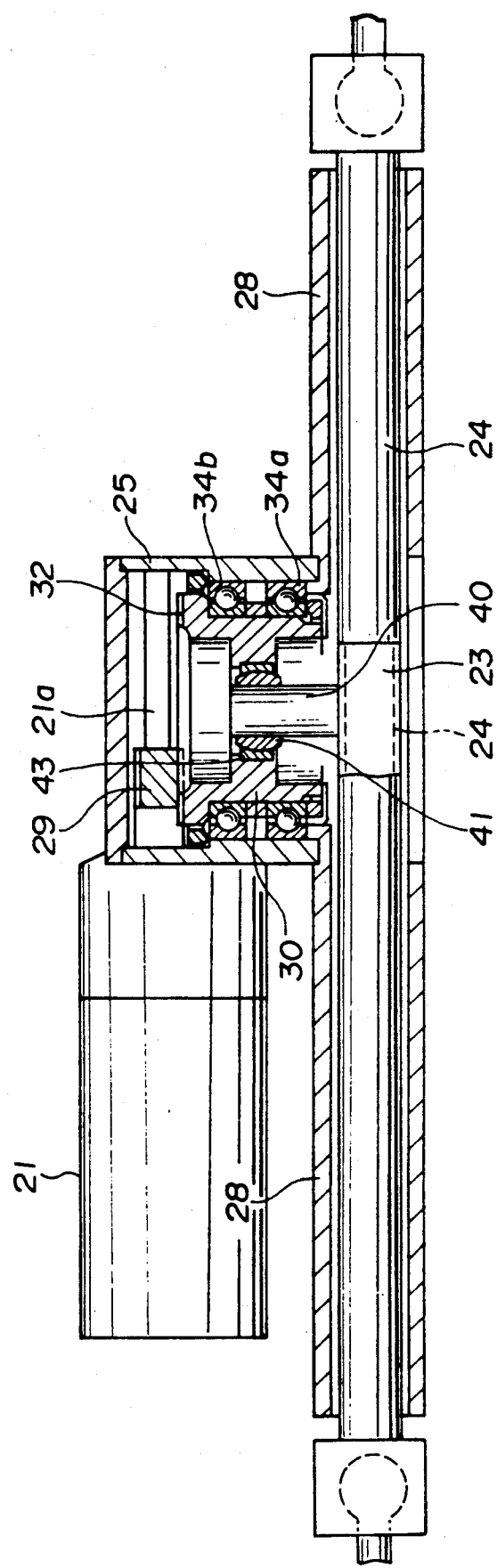
FIG. 33 is a front elevation, partly sectioned, of the eighteenth embodiment.

The last and eighteenth embodiment shown in FIGS. 32 and 33 is different from the second embodiment shown in FIG. 6 in that a spherical joint 41 and 43 are disposed between two axially spaced bearings 34a and 34b. With this arrangement, the amount of load on the bearings 34a and 34b are considerably decreased.

What is claimed is:

1. A rear wheel steering mechanism, comprising:
  a motor;
  an eccentric shaft having an axis of revolution and drivingly connected to said motor for rotational motion about said axis of revolution, said eccentric shaft includes an eccentric portion;
  a rod assembly movable in a longitudinal axis thereof;
  a motion transmitting body connected to said rod assembly in longitudinal fit manner, said motion transmitting body being rotatable about said longitudinal axis; and
  joint means whereby eccentric motion of said eccentric portion in response to rotational motion of said eccentric shaft causes said motion transmitting body to impart at least a reciprocal motion to said rod assembly in said longitudinal axis.

2. A rear wheel steering mechanism as claimed in claim 1, wherein said eccentric portion is in the form of a pivot having a center axis extending in parallel to and displaced from said axis of revolution.

3. A rear wheel steering mechanism as claimed in claim 2, wherein said motion transmitting body has bore means for receiving said pivot, and said joint means is a spherical joint including a spherical bearing fixedly coupled with said pivot and a spherical bearing retainer fixedly received by said bore means.

4. A rear wheel steering mechanism as claimed in claim 3, wherein said rod assembly is rotatable about said longitudinal axis thereof, and said motion transmitting body is rotatable with said rod assembly as a unit.

5. A rear wheel steering mechanism as claimed in claim 4, wherein said motion transmitting body is formed with a through bore which allows said rod assembly to extend therethrough.

6. A rear wheel steering mechanism as claimed in claim 5, wherein said rod assembly is formed with a circumferential groove and a shoulder at axially spaced portions, respectively, and said rod assembly has a stop ring received in said circumferential groove, and said motion transmitting body has an end face adjacent to one axial end of said through bore in abutting engagement with said stop ring and an extension adjacent to the opposite axial end of said through bore and bent into engagement with said shoulder to form a caulked joint.

7. A rear wheel steering mechanism as claimed in claim 1, wherein said eccentric portion has bore means having a center axis extending in parallel to and displaced from said axis of revolution.

8. A rear wheel steering mechanism as claimed in claim 7, wherein said motion transmitting body has a pivot extending into said bore means of the eccentric portion, and said joint means is a spherical joint including a spherical bearing fixedly coupled with said pivot and a spherical bearing retainer fixedly received by said bore means.

9. A rear wheel steering mechanism as claimed in claim 8, wherein said rod assembly is rotatable about said longitudinal axis thereof, and said motion transmitting body is rotatable with said rod assembly as a unit.

10. A rear wheel steering mechanism as claimed in claim 9, wherein said motion transmitting body is formed with a through bore which allows said rod assembly to extend therethrough.

11. A rear wheel steering mechanism as claimed in claim 1, wherein said rod assembly is rotatable about said longitudinal axis thereof, and said motion transmitting body is rotatable with said rod assembly as a unit.

12. A rear wheel steering mechanism as claimed in claim 1, wherein said motion transmitting body is rotatable relative to said rod assembly.

13. A rear wheel steering mechanism as claimed in claim 12, wherein said motion transmitting body is formed with a through bore which allows said rod assembly to extend therethrough.

14. A rear wheel steering mechanism as claimed in claim 13, wherein said rod assembly has a first radially extending wall opposed to one end face of said motion transmitting body adjacent to one end of said through bore, and said rod assembly has a second radially extending wall opposed to the opposite end face of said motion transmitting body adjacent to the opposite end of said through bore, and a first bearing is disposed between said first radially extending wall of said rod assembly and said one end face of said motion transmitting body, and a second bearing is disposed between said second radially extending wall of said rod assembly and said the opposite end face of said motion transmitting body.

15. A rear wheel steering mechanism as claimed in claim 14, wherein said rod assembly includes a first rod which is bored from one axial end thereof and disposed outside of said through bore of said motion transmitting body, and a second rod extending through said through bore of said motion transmitting body and inserted into said first rod in press fit manner, said second rod includes a shoulder opposed to said one axial end face of said motion transmitting body, said shoulder forming said first radially extending wall, said one axial end of said first rod forming said second radially extending wall.

16. A rear wheel steering mechanism as claimed in claim 14, wherein said rod assembly includes a shoulder opposed to said one end face of said motion transmitting body and an annular member coupled with said rod assembly adjacent to said the opposite end face of said motion transmitting body, said shoulder forming said first radially extending wall, said annular member forming said second radially extending wall.

17. A rear wheel steering mechanism as claimed in claim 7, wherein said motion transmitting body has a pivot extending into said bore means of the eccentric portion.

18. A rear wheel steering mechanism as claimed in claim 17, wherein said rod assembly is a single rod formed with a diametrical bore, and said motion transmitting body is in press fit in said diametrical bore.

19. A rear wheel steering mechanism as claimed in claim 8, wherein said rod assembly is a single rod formed with a diametrical bore, and said motion transmitting body is in press fit in said diametrical bore.

20. A rear wheel steering mechanism as claimed in claim 8, wherein said rod assembly is a single rod having a radially enlarged portion formed with a diametrical bore, and said motion transmitting body is in press fit in said diametrical bore.

21. A rear wheel steering mechanism as claimed in claim 17, wherein said rod assembly is a single rod having a reduced diameter middle portion connecting with the remaining portions via tapered shoulders, and said motion transmitting body includes a collar securing said single rod at said reduced diameter middle portion, and said collar of said motion transmitting body is formed with wedge surfaces acting on said tapered shoulders, respectively.

22. A rear wheel steering mechanism as claimed in claim 8, wherein said rod assembly is a single rod having a reduced diameter middle portion connecting with the remaining portions via tapered shoulders, and said motion transmitting body includes a collar securing said single rod at said reduced diameter portion, and said collar of said motion transmitting body is formed with wedge surfaces acting on said tapered shoulders, respectively.

23. A rear wheel steering mechanism as claimed in claim 13, wherein said collar of said motion transmitting body is divided into and made of two separate parts.

24. A rear wheel steering system as claimed in claim 17, wherein said rod assembly is a single rod formed with a diametrical hole, said motion transmitting body is formed with a through bore which allows said single rod to extend therethrough and also with two diametrically opposed bores, and a cotter pin extends through said diametrical hole of said single rod and has both ends received by said two diametrically opposed bores, respectively.

25. A rear wheel steering system as claimed in claim 24, wherein said pivot of said motion transmitting body is hollowed to allow insertion of said cotter pin.

26. A rear wheel steering system as claimed in claim 17, wherein said rod assembly is a single rod formed with two axially spaced circumferential grooves, said motion transmitting body is formed with a stepped through bore allowing said single shaft to extend therethrough, said stepped through bore includes a reduced diameter bore section and an increased diameter bore section, a hollowed bolt is slidably coupled with said single rod and includes a head and a tapped cylinder inserted into an annular space formed between said increased diameter bore section and said single rod, two stop rings are received in said circumferential grooves of said single rod in abutting engagement with said head of said hollowed bolt and an axial end face of said motion transmitting body adjacent to said reduced diameter bore section to limit axial separation of said hollowed bolt from said motion transmitting body.

27. A rear wheel steering system as claimed in claim 26, wherein said increased diameter bore section is tapped to threadedly engage with said tapped cylinder of said hollowed bolt.

28. A rear wheel steering system as claimed in claim 26, wherein a lock nut is threadedly engaged with said tapped cylinder in abutting engagement with the opposite axial end face of said motion transmitting body adjacent to said increased diameter bore section.

29. A rear wheel steering system as claimed in claim 28, wherein said increased diameter bore section is tapped to threadedly engage with said tapper cylinder of said hollowed bolt.

30. A rear wheel steering system as claimed in claim 17, wherein said rod assembly includes a first hollowed rod with a tapped bore, and a second hollowed rod with a tapped bore, and a tapped connection rod extends through said motion transmitting body and threadedly engaged with said tapped bores of said first and second hollowed rods.

31. A rear wheel steering system as claimed in claim 30, wherein said tapped connection rod is threadedly engaged with said motion transmitting body.

32. A rear wheel steering system as claimed in claim 30, wherein said tapped connection rod is in press fit in said motion transmitting body.

33. A rear wheel steering system as claimed in claim 30, wherein said motion transmitting body is formed with a through bore to receive said first and second hollowed rods.

34. A rear wheel steering mechanism, comprising:
a housing;
a motor mounted within said housing;
a gearing having a worm pinion fixedly coupled with said motor and a worm wheel;
an eccentric shaft rotatably mounted within said housing and coupled with said worm wheel, said eccentric shaft having an axis of revolution and drivingly connected to said motor for rotational motion about said axis of revolution, said eccentric shaft includes an accentric portion;
a rod assembly movable in a longitudinal axis thereof;
a motion transmitting body connected to said rod assembly in longitudinal fit manner, said motion transmitting body being rotatable about said longitudinal axis; and
joint means whereby eccentric motion of said eccentric portion in response to rotational motion of said eccentric shaft causes said motion transmitting body to impart at least a reciprocal motion to said rod assembly in said longitudinal axis;
said worm pinion has means for receiving an adjustment tool,
said housing being formed with a hole allowing insertion of said adjustment tool,
a cotter pin inserted into said worm wheel and said eccentric shaft to hold said worm wheel in poisiton relative to said eccentric shaft.

35. A rear wheel steering mechanism, comprising:
a housing;
an eccentric shaft rotatably mounted within said housing by two spaced bearings, said eccentric shaft having an axis of revolution and drivingly connected to said motor for rotational motion about said axis of revolution, said eccentric shaft includes an eccentric portion;
a rod assembly movable in a longitudinal axis thereof;
a motion transmitting body connected to said rod assembly in longitudinal fit manner, said motion transmitting body being rotatable about said longitudinal axis; and
joint means whereby eccentric motion of said eccentric portion in response to rotational motion of said eccentric shaft causes said motion transmitting body to impart at least a reciprocal motion to said rod assembly in said longitudinal axis,
said joint means being disposed between said two spaced bearings.

* * * * *